United States Patent [19]

Long et al.

[11] Patent Number: 4,900,107
[45] Date of Patent: Feb. 13, 1990

[54] COMPACT DISK CONTAINER STORAGE DEVICE

[75] Inventors: Jerry M. Long, Pleasanton; Peter J. Palmer, San Jose, both of Calif.

[73] Assignee: Creative Point, Inc., Fremont, Calif.

[21] Appl. No.: 371,921

[22] Filed: Jun. 27, 1989

Related U.S. Application Data

[63] Continuation of Ser. No. 795,072, Nov. 4, 1985, abandoned.

[51] Int. Cl.4 .............................................. A47B 81/06
[52] U.S. Cl. .......................................... 312/15; 211/41
[58] Field of Search ................... 211/40, 41; 206/387; 312/12, 15, 18, 9, 10, 17

[56] References Cited

U.S. PATENT DOCUMENTS 3,969,007 7/1976 Lowry ............................ 206/387 X
4,087,138 5/1978 McRae ........................... 206/387 X

FOREIGN PATENT DOCUMENTS 2387493 12/1978 France ................................ 206/387

Primary Examiner—Joseph Falk
Attorney, Agent, or Firm—Michael J. Hughes

[57] ABSTRACT

A storage device (10) adapted to store a plurality of compact disk containers, known as jewel boxes (11). The device (10) includes a hollow exterior frame (12) and an interior frame (28) which divides the interior into vertical columnar compartments (43, 44 and 45), each of which includes eight storage slots (50). Each of the compartments has an associated securing/release mechanism (60) which acts to restrain the jewel box (11) within the slot (50) and to release and eject it therefrom when pressure is applied to a release button (68). The device (10) is particulary adapted to store twenty four jewel boxes (11) in three columns, but is adaptable for other arrays and other rectangular solid objects.

15 Claims, 4 Drawing Sheets

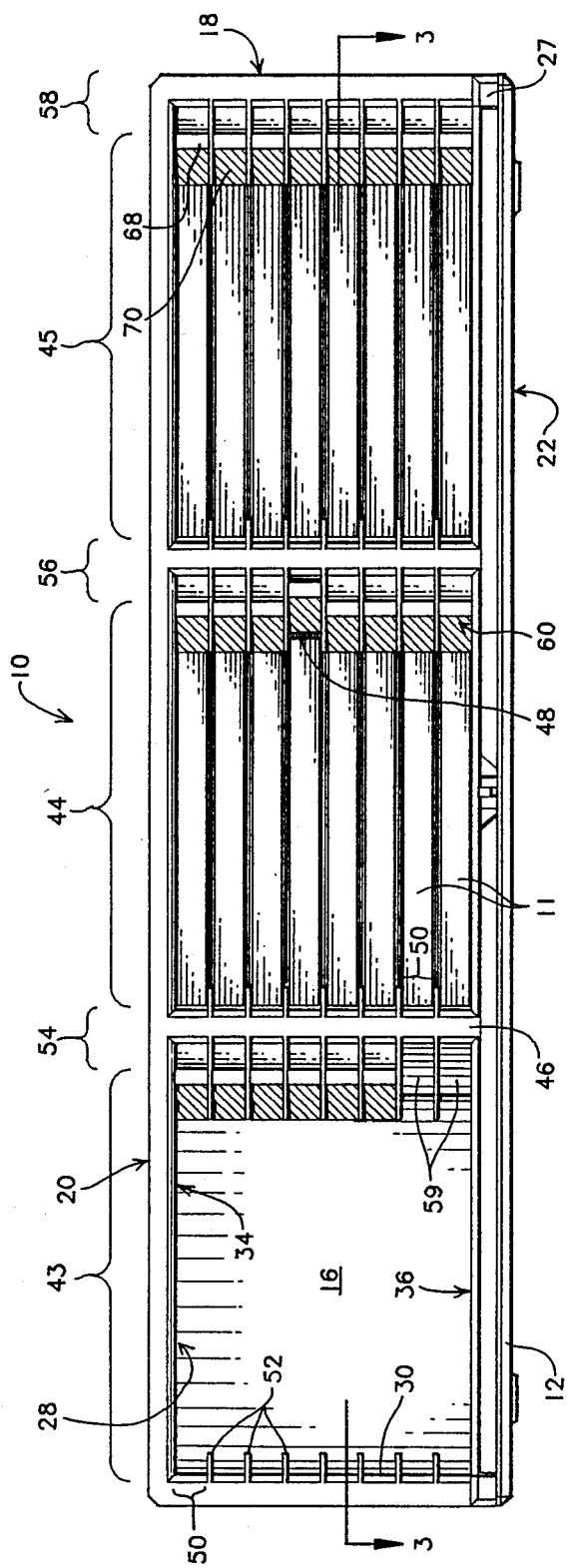
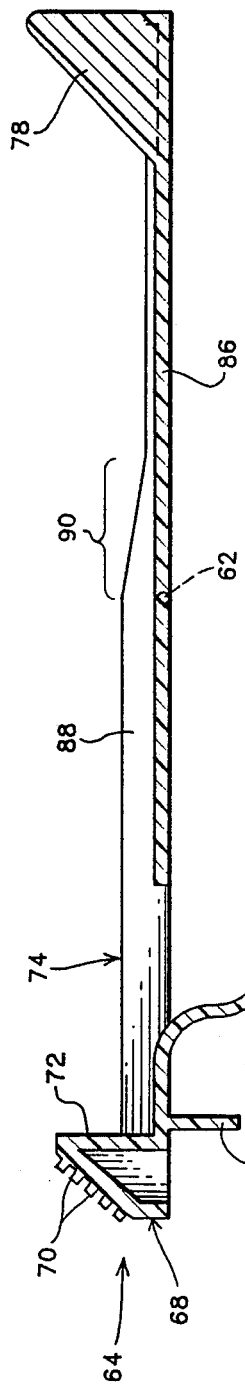
FIG. 2
FIG. 5

COMPACT DISK CONTAINER STORAGE DEVICE

This is a continuation of co-pending application Ser. No. 795,072 filed on Nov. 4, 1985, now abandoned.

TECHNICAL FIELD

The present invention relates generally to devices for storing discrete objects and more particularly to devices adapted for ready access storage of rectangular solid objects. The primary present usage of the Compact Disk Container Storage Device of the preferred embodiment of the present invention is for space efficient and quick-access storage of the jewel boxes conventionally sold as containers enclosing a digital audio compact disk, an optical disk used in sound reproduction.

BACKGROUND ART

Numerous components are sold to the public in rectangular solid containers which are adapted for contined use during the life of the product, and not merely as throw-away items. A prime example of this type of container is the plastic flip-open box in which typical magnetic tape cassettes (video or audio) are packaged. A more recent entry into the field is the "jewel" box utilized to enclose digital audio compact disks, the new standard for audio quality in sound reproduction. In each of these cases the actual product is contained within the box but is of such delicate nature that it is appropriate to retain the packaging container for use to protect the actual product throughout its lifetime. Furthermore, the container provides a convenient location for labelling and identifying data relating to the contents.

There is substantial demand for storage devices for enclosing and protecting quantities of containers such as the cassette boxes and the jewel boxes. The marketplace is filled with a wide variety of commercially utilized storage devices adapted for just this type of item. These storage devices range from extremely simple slotted boxes, either covered or uncovered, to sophisticated devices having mechanisms for ejecting specified boxes therefrom. The storage devices utilized in the prior art cover the entire spectrum of pricing and durability and are constructed of a wide variety of materials.

However, none of the prior art devices available to the public has adequately met all of the goals of: simplicity of design; visual aesthetics; ready accessability of contents; reliable operations mechanisms; visual accessability of label information; and reasonable density of storage. Improvements in each of these areas is particularly desirable in the industry. Furthermore, it is of extreme value to provide a device which combines all of the desirable characteristics set forth above.

DISCLOSURE OF INVENTION

Accordingly, it is an object of the present invention to provide a storage device for rectangular solid objects which combines secure storage, ready access to contents and visual accessability of the contents.

It is another object of the present invention to provide a storage device wherein the jewel boxes utilized for storing compact disks may be stored in a secure but convenient manner.

It is a further object of the present invention to provide a apparatus for partially ejecting a selected object from the storage device by use of a straightforward and simple mechanism.

It is yet another object of the present invention to provide a storage device which displays a plurality of objects in a visually aesthetically pleasing manner, with each of the objects being readily visually identifiable from the exterior of the device.

Briefly, a preferred embodiment of the present invention is a rectangular solid object storage device which is particularly adapted for receiving the jewel boxes conventionally sold as containers for compact disk optical audio devices. The storage device is adapted for receiving jewel boxes in a horizontally planar orientation for access from the front of the device. Various columns of storage slots within the device are provided, with each slot being adapted to receive exactly one jewel box.

The preferred embodiment includes an exterior frame in the shape of a hollow rectangular solid, being open to the front, an interior frame member received therein, and a door to enclose the entire volume when desired. The interior frame includes, in the preferred embodiment, three columns of storage slots, each column including eight slots. Each slot provides registration ledges for positioning the jewel box within the slot and a securing/releasing mechanism for restraining the jewel box from sliding out of the slot. The restraining portion of the mechanism is releasable by manual pressure with the act of releasing the securing element also acting to partially eject the box from the slot. The degree of ejection is only partial so that the box will not fall, but will still be supported within the slot on the ledges. However, the ejection is of sufficient degree so that the ejected jewel box is readily manually accessable to the user. The device is adapted to provide ready accessability to each of the compact disk boxes stored therein while retaining them in a dust free environment. The door is preferrably selected to be transparent or partially transparent such that the labelling information appearing on the edge of the boxes is readily visible from the exterior of the device. The device is particularly well adapted for use with home stereo equipment as its shape and size are compatible with standard storage and display components. Alternate embodiments are extremely desirable for portability, such as for use with automobile sound reproduction equipment.

An advantage of the present invention is that the entire interior volume of the storage device is substantially sealable such that the contents are protected from dust and accidental ejection.

Another advantage of the present invention is that a single, simple mechanism is utilized both to secure the object within the storage slot and also to eject the object therefrom when desired.

A further advantage of the invention is that it retains maximum visual accessibility to the labelling information contained on the end of the compact disk box or other stored object.

A still further advantage of the present invention is that an entire column of securing/ejection mechanisms may be integrally contructed, thus substantially reducing manufacture and assembly costs.

Yet another advantage of the present invention is that the securing/release mechanism is adaptable for use in a wide variety of applications, with substantial variation being possible in the size, relative dimensions and number of objects to be stored.

A still further advantage of the invention is that the elasticity and stored energy characteristics of the securing/release mechanism assembly cause the desired jewel box to be ejected to a position where it is easily handled by the user.

These and other objects and advantages of the present invention will become clear to those skilled in the art in view of the description of the best presently known mode of carrying out the invention and the industrial applicability of the preferred embodiment, as described herein and as illustrated in the several figures of the drawing.

BRIEF DESCRIPTION OF THE DRAWING

FIG. 2 is a front elevational view of the device of FIG. 1, shown with the door element removed;

FIG. 5 is a cross-section of the securing/ejecting lever component of the securing/release mechanism assembly.

BEST MODE OF CARRYING OUT INVENTION

Figure 1:
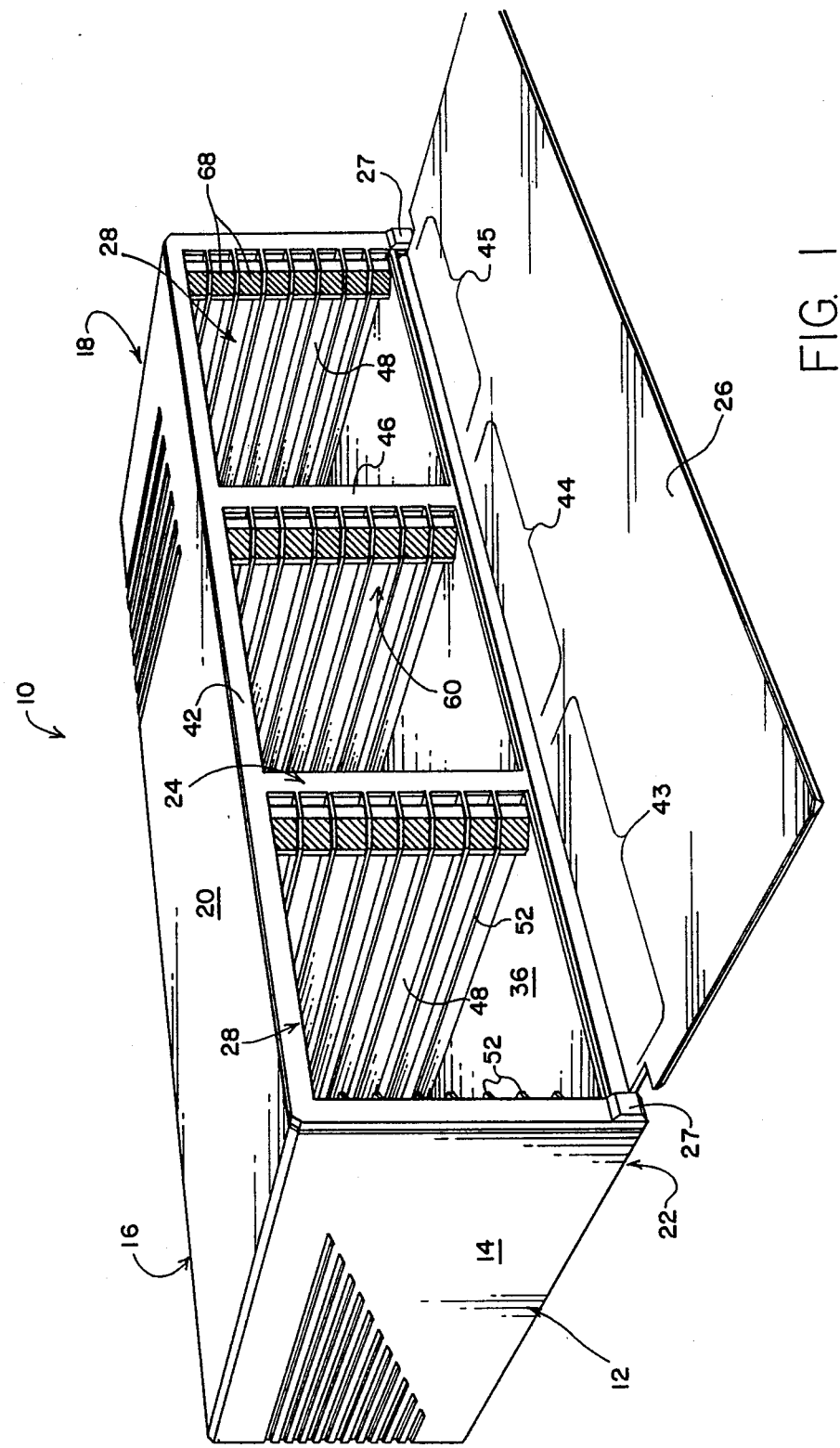
FIG. 1 is a perspective view of a rectangular solid object storage device according to the preferred embodiment of the present invention.

The presently preferred embodiment of present invention is that specific version of the overall rectangular solid object storage device which is particularly adapted for enclosing containers or "jewel" boxes utilized for packaging and sale of audio compact disks. The compact disk container storage device is illustrated in a perspective view in FIG. 1 and is designated by the general reference character 10.

Figure 3:
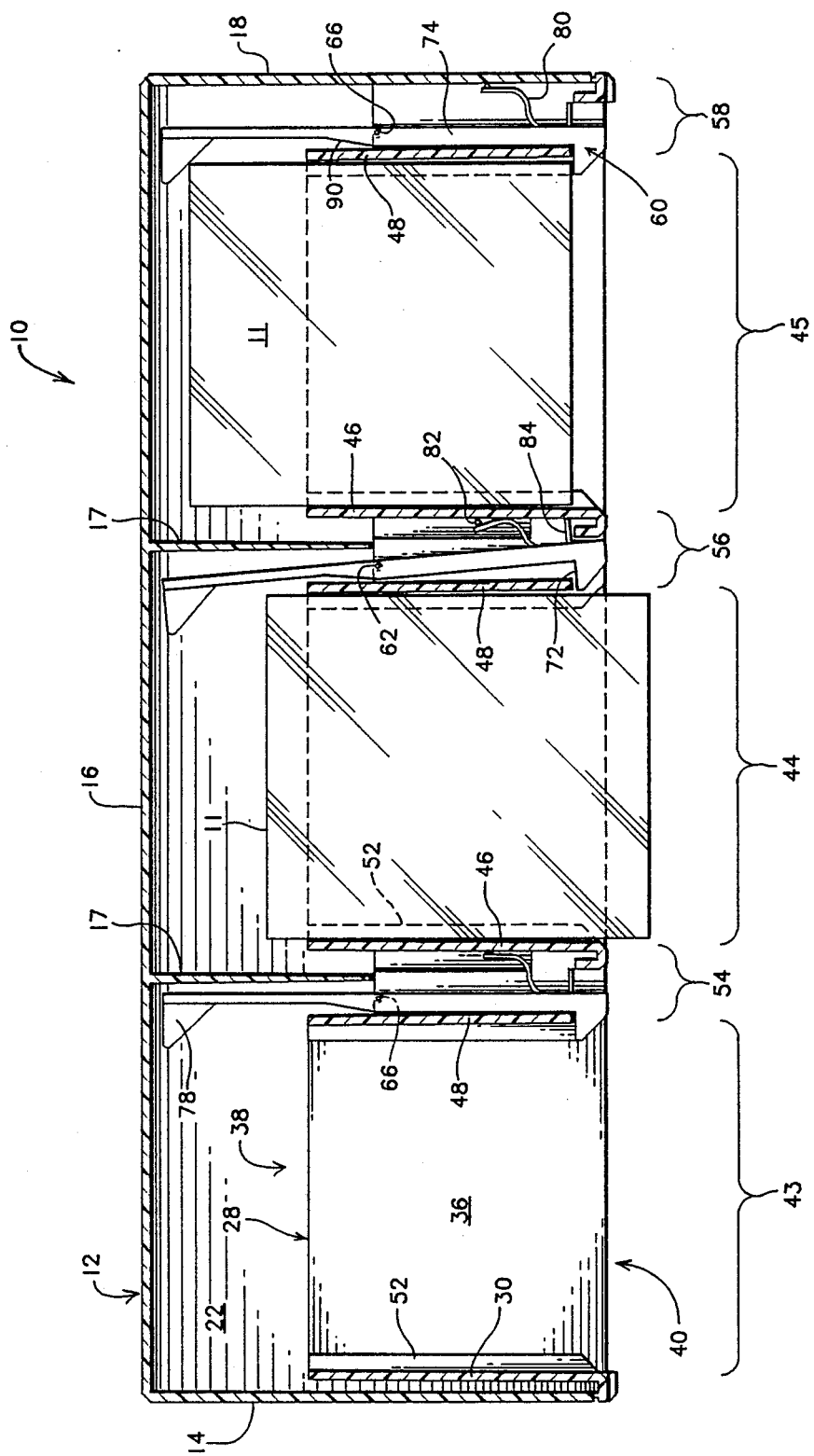
FIG. 3 is a cross-section taken along line 3—3 of FIG. 2.

The storage device 10 illustrated in FIG. 1 is the particular embodiment adapted to contain twenty four jewel boxes 11 in distinct slots. The jewel boxes 11 (shown in FIGS. 2 and 3), when the storage device 10 is fully loaded, are arrayed in three columns, each of the columns having slots adapted to receive eight of the boxes 11. As shown in FIG. 3, a jewel box 11 is completely installed within the fifth slot from the top on the right column and is partially installed in the fifth slot from the top in the center column.

The storage device 10 is constructed utilizing an exterior frame member 12 to enclose a rectangular solid shaped volume. The exterior frame member 12 includes a left side wall 14, a rear wall 16 including a pair of inwardly protruding structural central ribs 17, a right side wall 18, a top wall 20 and a bottom wall 22. the remaining side of the exterior frame member 12 is open to provide a front aperture 22. The front aperture 22 is adaptable for being closed by a door 26. When the door 26 is in a closed position, the entire internal volume of the exterior frame member 14 in enclosed in a substantially dust free manner.

The door 26 is attached via a pair of hinges 27 to an interior frame member 28 is adapted for slidably fitting within the exterior frame member 12. The interior frame 28 incudes a left side wall 30, a right side wall 32, a top wall 34, and a bottom wall 36. The interior frame 28 is not enclosed fore and aft, but includes a rear opening 38 and front opening 40 created by the rear and front edges of the walls 30, 32, 34, and 36 respectively. The front opening 40 is framed by a front ridge 42 which extends outward so as to abut smoothly against the front edges of the walls 14, 18, 20, and 22 of the exterior frame member 12. The interior frame 28 is divided into three distinct storage column compartments, these being a left compartment 43, a center compartment 44 and a right compartment 45. The means of separation include a left divider wall 46 and a right divider wall 48 for each of the storage column compartments 43, 44 and 45. In the case of the left compartment 43, the function of the left divider wall 46 is performed by the left interior side wall 30. However, in the center and right compartments 44 and 45 the left divider wall 46 and the right divider wall 48 are separate components.

Each of the compartments 43, 44 and 45 is divided into a plurality, in the preferred embodiment, eight, of slots 50 for receiving the jewel boxes 11. The vertical definition of slots 46 is determined by slot ledges 52 formed on the sides of the left divider walls 46 and the right divider walls 48 facing into the storage column compartments 43, 44 and 45. In the preferred embodiment 10, each of the interior facing walls is provided with seven slot ledges 52, each having a respective opposing slot ledge 52 on the opposite wall of the same compartment.

To the right of each of the storage column compartments 43, 44 and 45 are as series of mechanism tubes. A left mechanism tube column 54 corresponds to left compartment 43, a center mechanism tube column 56 corresponds to the center compartment 44 and a right mechanism tube column 58 corresponds to the right compartment 45. Each of the mechanism tube columns 54, 56 and 58, in the preferred embodiment 10, includes eight rectangular tubes 59 bounded to the right by the left divider wall 48 for the corresponding compartment and to the right by left divider wall 46 (except in the case of the right mechanism tube column 58 in which case the right boundary is the right side exterior wall 18.) The upper and lower boundaries of the rectangular tubes 59 are provided by the slot ledges 52 which extend throughout except for the uppermost and lowermost rectangular tubes 59 which are bounded respectively by the top interior wall 34 and the bottom interior wall 56. Since each of the rectangular tubes 59 is a portion of the interior frame member 28 they are open both to the front and to the rear.

Figure 4:
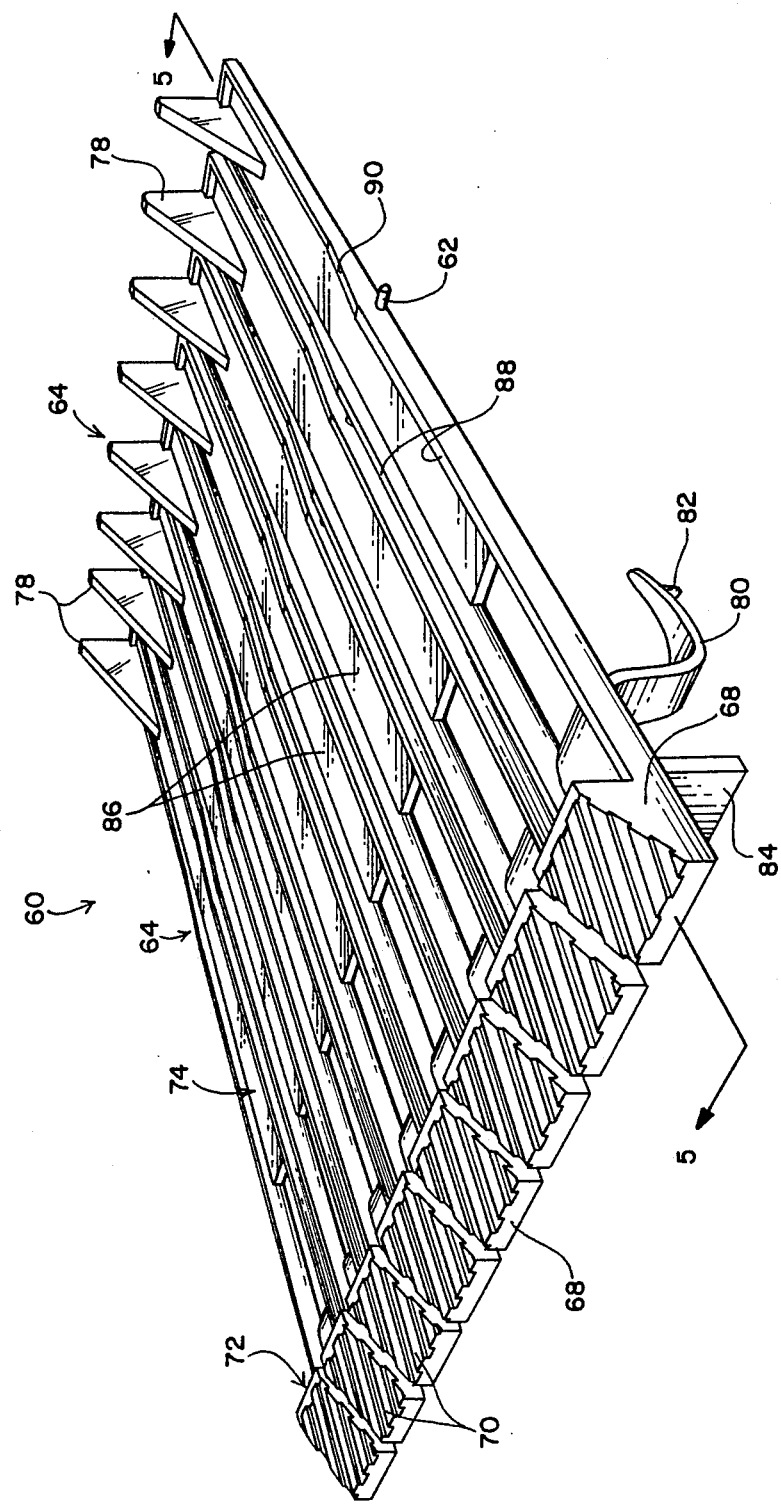
FIG. 4 is perspective view of a complete securing-/release mechanism assembly unit adapted for use in eight adjacent vertical storage slots.

In the assembled storage device 10 each of the mechanism tube columns 54, 56 and 58 will contain a release mechanism assembly 60. The release mechanism 60 is shown in a perspective view in FIG. 4. In this illustration it may be seen that the securing/release assembly 60 includes a torsion post 62 which extends vertically from top to bottom of the assembly 60 and a series of individual lever elements 64. For the securing/release mechanism assembly 60 adapted for insertion into the preferred embodiment of the storage device 10 there are eight lever elements 64 for each assembly 60. The preferred embodiment of the mechanism assembly 60 is an integrally formed unitary element with the torsion post 62 providing the connecting component and the fulcrum/pivot about which the lever elements 64 rotate. In this manner, each of the lever elements 64 is physically connected to each of the other lever elements in such a manner that torque applied to one will be partially transmitted throughout the assembly 60.

The mechanism assembly 60 is installed in each of the mechanism tube columns 54, 56, and 58 by inserting the mechanism assembly 60 from the rear of each of the mechanism tube columns 54, 56 or 58. One lever element 64 will fit into each of the rectangular tubes 59. A semicircular post detent 66 is formed in the slot ledge 52 at the center of the rear of each of the rectangular tubes 59. The post detent 66 is adapted for receiving the torsion post 62 when the mechanism assembly 60 is installed to its proper position. The detent secures the fulcrum of the mechanism 60 such that it is stationary with respect to the slot 50. The interaction of the torsion post 62 with the post detent 66 prevents the mechanism assembly 60 from sliding forward within the mechanism tube columns more than is desired. Slippage to the rear is prevented by a variety of factors which will be discussed in more detail as follows.

As is best shown in the cross-sectional views of FIGS. 3 and 5, the lever elements 64 of the securing-/release mechanism assembly 60 include a large number of integral components formed therein. The forwardmost portion of the element 64 is a release button 68 which may include a series of friction ridges 70 formed on the surface thereof make it more easily manipulable by the user's finger. The rear portion of the release button 68 provides a securing surface 72 for overlapping and abutting against the front edge of the jewel box 11 when the jewel box 11 is contained within the slot 50 (see column 45 in FIG. 3). The securing surface 72 also abuts against the front edge of the right divider wall 48 to prevent the mechanism assembly 60 from sliding rearward.

The release button 68 is situated at the front end of a lever arm 74. The rear end of the lever arm 74 terminates in a wedge member 76 which is adapted to abut against the rear right corner of the jewel box during the installed mode of the device 10. The wedge 76 also applies ejection force to the jewel box 11 when desirable.

Slightly rearward of the release button 68, the lever arm 74 is provided with a return spring arm 80 which extends outward therefrom in a curved manner. The return spring arm 80 is of the expansion type, resilient and has a shape such that it abuts against the interior of the left divider wall 46 (or in the case of the right mechanism tube column 58, the right side exterior wall 18) and operates to urge the lever arm 74 and thus the entire lever element 64 to the left so as to have the securing surface 72 maximally overlap the front edge of the right divider wall 48 and the maximum portion of the front surface of the jewel box 11. A small protrusion 82 is provided on the portion of the return spring arm 80 which abuts against the left divider wall 46. The protrusion 82 provides a contact point with the left divider wall 46 and may be adjusted in size during the molding process in order to achieve desired degree of tension created by the spring arm 80 on the lever element 64.

Slightly forward at the point of which the return spring arm 80 intersects the lever arm 74 is provided a stop post 84. The stop post 84 is a rigid element having a length such that when the return spring arm 80 has been compressed to the desired degree, the stock post 84 will contact the right divider wall and prevent additional compression.

The lever arm 74 includes a vertical lever arm wall element 86, and pair of a horizontal strengthening beams 88, provided to increase the rigidity and durability of the lever arm 74. A portion of each strengthening beam 88 is removed near the rear portion of the lever arm 74 to provide clearance angling 90. In the preferred embodiment 10 the clearance angling 90 is a six degree slope towards the lever arm wall 86 in order to allow the strengthening beams 88 to avoid contact with the rear portion of the right divider wall 48 when the release button 68 is forced rightward and the return spring arm 80 is compressed.

The preferred embodiment 10 includes only four separate molded elements. These are the exterior frame member 12, the interior frame member 28, the door 26 and the securing/release mechanism assembly 60. Of course, in the embodiment 10 shown, three separate mechanism assemblies are combined within the single storage device 10. The elements are adapted to frictionally fit and physically snap within each other such that no special connecting hardware is required, with the exception that it is desirable to use hinging hardware 27 to attach the door 26.

For aesthetic purposes, as well as for functionally matching the shape of the jewel boxes 11 or other objects to be contained therein, the overall shape of the device is a rectangular solid. The dimensions are dependent upon the precise contents involved, but for use with standard compact disk jewel boxes 11, the embodiment 10 has an overall width of 46.83 cm, (18.66 in.), a height of 12.02 cm (4.79 in.) and a depth of 16.94 cm (6.75 in.). Each of the storage column compartments 43, 44 and 45 has a width of 12.37 cm (4.93 in.) and a total height of 10.09 cm (4.02 in.). Each of the slots 50 has a height of 1.13 cm (0.45 in.) while the slot ledges 52 extend a distance of 0.63 cm (0.25 in.) into the storage compartments 43, 44 and 45 while having a thickness of 0.15 cm (0.06 in.). The interior divider walls 46 and 48 extend a distance of 10.87 cm (4.33 in.) from front to back. The mechanism tube columns 54, 56 and 58 have a width of 2.47 cm (0.985 in.) and are otherwise of the same dimensions as the storage column compartments 43, 44 and 45.

The vertical dimensions of the securing/release mechanism assembly 60 are adapted to fit within the mechanism tube columns 54, 56 and 58 with the portions of the torsion post 62 between adjacent lever elements 64 having a length of 0.20 cm (0.080 in.) The release button 68 has a total width of 2.38 cm (0.950 in.) and the slanted portion thereof including the friction ridges 70, represents a width of 1.51 cm (0.600 in.). The lever arm 74, between the rear of the release button 68 and the front of the wedge 76, has a length of 13.18 cm (5.25 in.). The wedge 76 is in the form of a right triangle having a base of 1.76 cm (0.700 in.) and a side (coextensive with the lever arm 74 of) 2.48 cm (0.989 in.). The stop post 84 has a length of 0.879 cm (0.350 in.) and the return spring arm 80 extends outward a distance of 1.51 cm (0.600 in.) and rearward a distance of 1.88 cm (0.750 in.) from its point of attachment to the lever arm 74. The vertical thickness of the lever arm wall 86, and all other vertical components of the lever element 64 is 1.08 cm (0.430 in.).

Of course, the precise dimensions of all of these elements are not critical to the operation of the storage device 10 but are selected merely to maximize efficiency. In particular, if the object to be stored within the storage device 10 in something other than a jewel box 11, the dimensions of all of the components will be modified accordingly.

Although the invention has been described particularly in terms of a storage device 10 adapted for containing jewel boxes 11 it is readily adaptable for any other rectangular solid object. Indeed, a complete rectangular solid is not required for the operation of device 10. As long as the right front and right rear portions of the object to be stored conform to abutment against the securing surface 72 and the wedge 76, nearly any shape of object may be adequately stored within the device 10. For proper operation, it is necessary that the stored object be at least semirigid.

The number of objects to be stored within the device 10 is also entirely a matter of choice. It is envisioned that, in addition to the preferred embodiment 10, alternate embodiments of the same device will be constructed, with one such embodiment including two, rather than three, storage column compartments and another having only a single storage column compartment. Furthermore, the number of slots within each storage column compartment may be modified as desired. It is presently envisioned that other embodiments utilizing only six slots per compartment will be constructed. None of these alternate embodiments significantly alter the nature or operation of the invention.

Although the selection of materials for the construction of the device 10 is largely a matter of choice, the preferred material for the exterior frame member 12 and the interior frame member styrene. Other materials of the rigid plastic family are also quite adequate. Although cost considerations make them unlikely choices, metal or wood designing are feasible as well, rigidity and strength being the primary considerations. Typically, the frame members are selected to be opaque, although transparency or translucency will not in any way alter their effectiveness. Color is entirely a matter of individual choice.

The door 26 is ordinarily selected to be a transparent or nearly transparent material which provides visual access to the contents of the device 10 when the door 26 is closed. In the preferred embodiment the door 26 is contructed of ABS or styrene. Although glass or various other materials may be substituted without altering the nature of the invention. It may also be aesthetically desirable to utilize an opaque door.

The securing/release mechanism assembly 60 is an integral molded plastic element in the preferred embodiment 10. The integral construction is important to the effective operation since the torsion post 62 operates to cause all of the lever elements 64 to be torsionally dependent on each of the others. This prevents a individual lever element 64 from slipping or otherwise operating totally independently of the others within the same mechanism assembly 60. One result of this interaction is that the mechanism assemblies 60 can only be disassembled by simultaneously releasing all of the release buttons 78 on the associated lever arms 74 at once in order to slide the assembly 60 rearward through the rectangular tubes 59. Accidental disassembly is thus less effectively eliminated. Of course, although the integral construction of the mechanism assembly 60 has been found to be the optimal way to achieving the desired results, there are other methods of constructing the assembly 60 to achieve the same goals. One such method is to torsionally connect the lever element 64 together in some other manner, such as by a rubber band placed about each of the lever arm 74 from top to bottom in the column. Similarly, a common vertical post about which each of the lever elements pivot, rather than a torsion post, may also be provided. In the preferred embodiment 10, the preferred material for the mechanism assembly 60 is polypropylene or K-resin and the thicknesses of the torsion posts 62 are selected such that a rotation of six degrees is permitted with maximum material memory and resiliency and with minimal degredation of the torsion post material upon repeated use. For aesthetic purposes it may be desirable to cause the mechanism assembly 60 to have a different color appearance from that of the exterior frame 12 and the interior frame 28.

Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The present invention is adapted to be utilized for storage of solid objects, especially solid objects in the shape of rectangular solids and most specifically the preferred embodiment 10 is designed for use with the jewel boxes 11 in which audio compact disks are sold. The invention is adapted for storing a plurality of the jewel boxes 11 in a compact, readily accessable manner and in an aesthetically pleasing array. Reference is made to the figures of the drawing to aid in understanding the manner in which the storage device 10 operates to effectively store, secure and, when desired, release the jewel boxes 11 which are stored therein.

Initially, user will observe a totally enclosed volume with the door 26 closed. The door is hingedly opened to provide access to the entire front aperature 24 of the device 10. Of course the user will be able to visually observe the contents of the device 10 even with the door closed, due to the transparency of the door 26. However, once opened, the user has the option of installing an additional jewel box 11 within an unoccupied slot 50 or ejecting a previously installed jewel box 11, as desired. The cross-sectional illustration of FIG. 3 shows individual slots 50 in all three possible modes. The slot 50 in the left storage column compartment 43 is shown as empty, that of the right storage column compartment 45 has a jewel box 11 fully installed therein, and the slot in the center storage column compartment 44 illustrates a slot 50 having the jewel box 11 in the fully ejected position. In the case of the empty slot it is seen that the force of the return spring arm 80 causes the securing surface 72 to extend completely beyond the front edge of the right divider wall 48 until the strengthening beams 88 abut against the right divider wall 48.

In the event that the user wishes to store a jewel box 11 within this empty slot 50 in the left storage column compartment 43, the user will simply vertically and horizontally align the jewel box 11 so that it fits between the slot ledges 52 and push rearward. The angled front of the release button 68 would cause the release button 68 to be pushed rightward by the rearward force on the jewel box 11 until the distance between the left edge of the release button 68 and the opposing right divider wall 48 is sufficient to permit the jewel box 11 to pass there between. The jewel box 11 is then continually forced rearward until its front right corner passes the release button 68 and the rear right corner engages the wedge 76. An audible snap will then occur as the force of the return spring arm 80, combined with the force of the jewel box 11 upon the wedge 76, will then cause the lever element 64 to rotate about the fulcrum/pivot formed by the torsion post 62 such that the securing surface 72 will be forced left to overlap the front portion of the jewel box 11. At this point the jewel box 11 will be installed, such as shown in the right storage column compartment 45.

When the jewel box 11 has been installed it may be seen that the overlap of the securing surface 72 with the front right portion of the jewel box 11 prevents the jewel box 11 from sliding forward or otherwise moving within the slot 50. This is a secure installation, with the dimensions properly selected, such that the jewel box 11 is prevented from motion within the slot and no vibrational damage is likely to occur to the contents during usage.

When it is desired to eject a jewel box 11 from its slot 50, then the user applies rightward pressure to the release button 68. Slippage in applying this pressure is minimized by the presence of the friction ridges 70. The rightward pressure on the release button acts to compress the return spring arm 80, remove the abutment of the securing surface 72 from the front edge of the jewel box 11 so as to allow release and also to force the wedge 76 to apply positive pressure against the rear right corner of the jewel box 11. As the release button 68 is slid rightward the lever arm 74 flexes with increased torsion force since the abutment of the securing surface against the jewel box 11 prevents release. The wedge 76 cannot slide until the jewel box 11 is free to move. The release is a sudden event and the lever arm 74 and wedge 78 snap in such a manner as to rapidly urge the jewel box 11 forward out of the slot 50. The degree of the releasing force provided to the jewel box 11 is limited by the stop post 84 and by sliding friction such that the jewel box 11 is typically only forced forward to the position shown in the center storage compartment 44. This will be somewhat dependent upon the materials and thicknesses of the lever element 64 but represents the desired goal to which other factors are adjusted. In this position the jewel box 11 is still supported on the slot ledges 52 and will not fall out of the device. Instead, the jewel box 11 has a sufficient exposed surface that the user may grasp it and remove it manually the remaining distance. After it has been removed, the force of the return spring arm 80 causes the lever element 64 to again rotate back to the position shown in the left storage column compartment 43. It is notable that, in the event that the stop post 84 becomes broken, the interaction of the strengthening beam 88 in the area of the clearance angling 90 with the edge of the left divider wall 46 will provide an alternative limiting of the degree of rotation of the lever element 64. Both forms of limiting the rotation are desirable for the dual purposes of causing the jewel box 11 to be ejected only to a desired distance and further to prevent undue strain upon the torsion post 62.

As can be seen from the above, the storage device 10 of the present invention is extremely suitably adapted for use by owners of compact disk containers (jewel boxes) or any other rectangular solid object. It provides extremely secure and convenient access to the contents, contains a convenient number of objects and provides exterior visual access. Hence, it is expected that the invention will acheive extreme desirability in the marketplace.

In light of all of the above stated objects and advantages of the invention, it is projected that devices manufactured according to the invention will have extremely widespread industrial utility and commercial viability.

We claim:

1. A storage device for storing a plurality of discrete objects, comprising:

A hollow exterior frame member having one open side;

an interior frame member contained within the exterior frame member, the interior frame member including dividing means for dividing the interior of the device into a plurality of slots for receiving the objects, each of said slots being in the general shape of and slightly larger than the objects and being accessible from said open side; and securing/release means associated with each of said slots to secure one of the objects therein and, upon manipulation, to release and eject the object therefrom such that the ejected object is manually accessible from the exterior of the device, the securing/release means including a securing surface for abutting against the front of the object a lever, extending along one side of the object, a fulcrum, and a solid triangular wedge member for abutting against a rear corner of the object and forcing the object both against said securing surface and laterally against said dividing means situated on the opposite side of the object; and means for rotating the lever about said fulcrum, and further including urging means to continually urge said securing surface to a position overlapping said front opening.

2. The device of claim 1, wherein, the exterior frame member has an exterior shape in the form of a rectangular solid.

3. The device of claim 1, and further including a door for enclosing the entire volume.

4. The device of claim 3 wherein said door is at least semi-transparent such that a portion of each of the objects is visually accessible from the exterior of the device when said door is closed.

5. The device of claim 1 wherein the securing/release mechanism is an integrally formed member.

6. The device of claim 1 wherein said urging means is in the form of a spring arm attached to said lever.

7. The device of claim 1 wherein said slots are arranged in two or more vertical columns; and the securing/release mechanisms for each of said slots within each said column are integrally connected to each other securing/release mechanism within said column.

8. The device of claim 1 wherein said plurality of slots are arrayed in three adjacent vertical columns with each of said columns including eight of said slots.

9. A securing/release mechanism adapted for use in combination with a compartment adapted for receiving an object in the shape of a rectangular solid, the mechanism, comprising;

a lever portion extending along one side of the compartment, the lever portion being free to rotate in one dimension about a single fulcrum/pivot and being anchored only about said fulcrum/pivot, said fulcrum/pivot being fixed with respect to the compartment; the front of the lever portion extending to a position at the front portion of the compartment and the rear end of the lever portion extending beyond said fulcrum/pivot to a position at the rear end of the compartment.

a securing surface portion attached to said front end of the lever portion, the securing surface being adapted to overlap a portion of the front surface of the object when the object is installed in the compartment;

a solid triangular wedge portion arranged to engage said rear end of the lever portion, the wedge portion being adapted to abut against a rear corner of the object and to provide a continual diagonal force thereon so as to force the object against the side of the compartment opposite the lever portion when the object is installed within the compartment;

urging means to continually urge the securing surface portion to a position of maximal overlap of the object; and release means, accessible to a user, being adapted such that pressure upon the release means overcomes the urging force of the urging means, causes the lever portion to rotate about said fulcrum/pivot to a position wherein the securing surface does not overlap the front of the object, and forces the wedge portion against the rear corner of the object so as to partially forcibly eject the object from the compartment.

10. The mechanism of claim 9 wherein
the securing release mechanism is an integrally formed single component.

11. The mechanism of claim 10 wherein
the urging means include a spring arm attached to the lever portion, said spring arm being of the expansion type and being buttressed against a buttress element, said buttress element being stationary with respect to the compartment.

12. The mechanism of claim 11 and further including rotation restriction means to limit the degree of rotation of the lever portion about said fulcrum/pivot.

13. The mechanism of claim 9 wherein
said fulcrum/pivot is situated near the center of the lever portion.

14. The mechanism of claim 9 wherein
the release means includes a button formed adjacent to the securing surface portion, said button including friction ridges to facilitate non-slipping pressure being applied to said button.

15. The mechanism of claim 9 wherein
the force of pushing one of the objects into an empty compartment operates the release means without further user contact therewith.

* * * * *